UNITED STATES PATENT OFFICE.

ROBERT M. THOMPSON, OF SUTTON, NEBRASKA.

WURTZILITE METHOD AND PRODUCT.

SPECIFICATION forming part of Letters Patent No. 655,131, dated July 31, 1900.

Application filed March 3, 1900. Serial No. 7,237. (No specimens.)

*To all whom it may concern:*

Be it known that I, ROBERT M. THOMPSON, a citizen of the United States, residing at Sutton, in the county of Clay and State of Nebraska, have invented certain new and useful Improvements in Wurtzilite Methods and Products; and I do hereby declare the following to be a full, clear, and exact description of the invention, such as will enable others skilled in the art to which it appertains to make and use the same.

This invention relates to a method of treating the mineral wurtzilite and to a product or composition of matter formed thereby which is adapted for use in the manufacture of fire-bricks, pavements, construction of sewers, electrical insulators, including knobs, handles, tubes, buttons, and the like, waterproof roofing, sheathing, floor-coverings, house-linings, and many other hard, pliable, or semipliable articles.

In a former application filed by me April 23, 1898, Serial No. 678,634, I have described and claimed a method of treating wurtzilite which consists in reducing the crude mineral to a softened or fused state by the action of heat. By thus softening the mineral it is placed in condition to be combined with other materials to harden it by a physical or chemical change, or both, during the heating process, and by reducing it to a complete fused or melted state a product is formed which differs from the crude mineral in important particulars, such product being soluble in the ordinary solvents for reducing caoutchouc and like substances—such, for example, as spirits of turpentine, bisulfid of carbon, naphtha, or chloroform—and also fusible in an ordinary vessel, whereas the crude material does not possess these properties. This product may also be combined with hardening materials to render it more durable and adapt it to be used in the manufacture of waterproof pliable and semipliable paving compositions and sheathings and solid articles of great density and hardness. The method of hardening the mineral and the product formed thereby constitute the subject-matter of the present application.

In carrying my invention into practice I place a quantity of the crude wurtzilite in a closed vessel or retort and subject it to heat from 800° to 1,000° Fahrenheit, which has the effect of first softening the mineral and reducing it to a spongy state and if continued for a period of several hours of reducing it to a complete fused or melted state. The step of incorporating the hardened material or materials may be carried out at either of these stages; but I prefer to effect the combination with the fused or melted material, especially when sulfur or its equivalent is employed to harden the wurtzilite by a chemical change, as much better results are obtained owing to the elimination of the volatile constituents of the mineral. Instead of retorting the mineral it may be heated by steam, and this heating medium is deemed preferable in that it retains all the properties of the mineral, and under its action the mineral is softened and has the consistency of cheese. The time consumed in attaining the required temperature by the use either of a retort or steam will be varied in accordance with the amount of mineral treated.

One way of carrying the method into practice for making solid articles is as follows: The crude mineral (or the soluble and fusible product) is fused or melted by the action of heat, and a hardening material—such as mica, asbestos, or soapstone—is incorporated therewith and afterward a quantity of sulfur. After the addition of these materials in proper proportions the mixture ferments or rises in the form of an yeast-like mass, which is subjected to heavy pressure to form the article desired or reduced to a block of the material which may be afterward cut by any suitable means and polished. In heating the mineral and before the addition of the materials specified it is first melted in a closed vessel or retort and then placed in an open vessel with as much heat applied thereto as it will stand without catching afire, and when in the latter condition the mica, asbestos, or soapstone, either one or all, if desired, is thoroughly commingled with the said heated mineral by stirring the mass. As much of any one of the said materials will be used as the heated mass of mineral will take up, and after this operation sulfur is incorporated in quantities of from four per cent. to ten per cent. in weight and according to the hardness required. When the sulfur is mixed with the other materials, as stated, it will set up a fermentation, and while in this condition the mass is molded under very heavy pressure, and preferably in a copper mold. The sulfur is added to the mixture to vulcanize it, and this is increased by molding under heavy pressure. In adding the mica, asbestos, or soapstone they are first pulverized, so as to become readily incorporated with the mineral, and a composite article of great density and hardness is formed. It will be understood that the molds used may be of any preferred size, shape, and construction suitable for the purpose and to form different articles.

Another way of carrying the method into practice is to incorporate either one or all or any desired combination of the aforementioned physically-hardening materials—mica, asbestos, and soapstone or their equivalents—with the wurtzilite while the latter is in either a softened or a fused state, and then subject the mass to pressure in a mold or in any other preferred way. When the wurtzilite is to be used as a sheathing or coating, it is incorporated with a suitable solvent and reduced to a liquid state, spread upon the material to which it is to be applied, and the hardening material then pressed into the composition to increase its durability and wearing qualities. The incorporation of either of the described materials with the wurtzilite under pressure will produce an exceedingly hard and dense product which may be used in the manufacture of paving-bricks, insulators, and various other articles.

As set forth in the foregoing description, the wurtzilite may be hardened physically by combining mica, asbestos, or soapstone therewith, and both physically and chemically by employing sulfur in connection with one or all or any combination of these materials. I have discovered also that when the volatile elements of the wurtzilite are eliminated by the action of heat the resulting wurtzilite product may be vulcanized or chemically changed and hardened by the use of sulfur alone. In hardening the wurtzilite in this manner a proper proportion of sulfur is incorporated with the fused or melted wurtzilite (or the refused hard wurtzilite product) in a suitable mold or vessel and the mixture allowed to ferment and rise when it is molded under heavy pressure. The amount of sulfur employed will vary according to the degree of hardness required.

It will be understood that my invention broadly contemplates the incorporation in any desired manner of a hardening material with the wurtzilite while the latter is in a softened or a fused state and the hardening of the latter in either of the ways set forth, and hence I do not limit myself to the exact kinds and proportions of materials herein specified and preferably employed for the purpose.

Having thus described the invention, what is claimed as new is—

1. The method of treating wurtzilite, which consists in softening the same, and combining a hardening material therewith.

2. The method of treating wurtzilite which consists in reducing the wurtzilite to a fused or melted state, and combining a hardening material therewith.

3. The method of treating wurtzilite, which consists in reducing the same to a softened state, and incorporating a powdered physically-hardening material therewith.

4. A product or composition, composed of wurtzilite combined with a hardening material.

In testimony whereof I affix my signature in presence of two witnesses.

ROBERT M. THOMPSON. [L. S.]

Witnesses:
B. F. SCHAEFLE,
W. E. THOMPSON.